US012037829B2

(12) United States Patent
Benedetti et al.

(10) Patent No.: US 12,037,829 B2
(45) Date of Patent: Jul. 16, 2024

(54) HINGE FOR THE ROTATABLE MOVEMENT OF A DOOR, A LEAF OR THE LIKE AND SYSTEM FOR FIXING THE LATTER TO A STATIONARY SUPPORTING STRUCTURE

(71) Applicant: Colcom Group S.p.A., Nave (IT)

(72) Inventors: Luca Benedetti, Nave (IT); Mihai Mesaros, Nave (IT)

( * ) Notice: Subject to any disclaimer, the term of this patent is extended or adjusted under 35 U.S.C. 154(b) by 37 days.

(21) Appl. No.: 17/615,920

(22) PCT Filed: Jun. 3, 2020

(86) PCT No.: PCT/IB2020/055217

§ 371 (c)(1),
(2) Date: Dec. 2, 2021

(87) PCT Pub. No.: WO2020/245731

PCT Pub. Date: Dec. 10, 2020

(65) Prior Publication Data

US 2022/0316249 A1 Oct. 6, 2022

(30) Foreign Application Priority Data

Jun. 3, 2019 (IT) ........................ 102019000007902
Jun. 3, 2019 (IT) ........................ 102019000007905
Jun. 3, 2019 (IT) ........................ 102019000007908

(51) Int. Cl.
*E05D 7/06* (2006.01)
*E05D 7/00* (2006.01)
(Continued)

(52) U.S. Cl.
CPC ............. *E05D 7/0018* (2013.01); *E05D 7/06* (2013.01); *E05D 11/10* (2013.01); *E05F 1/1253* (2013.01);
(Continued)

(58) Field of Classification Search
CPC ...... E05D 5/0246; E05F 1/1041; E05F 1/105; E05F 1/12; E05F 1/1246; E05F 1/1253; E05F 1/14
See application file for complete search history.

(56) References Cited

U.S. PATENT DOCUMENTS 6,161,255 A * 12/2000 Garrett ................ E05D 11/1064 16/382
6,766,561 B1 * 7/2004 Cheng ..................... E05D 11/00 16/382
8,863,356 B2 * 10/2014 Bacchetti .................. E05F 3/10 16/54
2003/0121321 A1 * 7/2003 Dempster ................. E05D 3/12 16/223

(Continued)

FOREIGN PATENT DOCUMENTS

DE 9216324 4/1994
DE 4240361 6/1994

(Continued)

OTHER PUBLICATIONS

Web page: http://artultra.ru/steklyannye_dveri/furnitura_dlya_steklyannyh_dverey/kreplenie_steklyannyh_dverey/.

*Primary Examiner* — Emily M Morgan
(74) *Attorney, Agent, or Firm* — Themis Law

(57) ABSTRACT

A hinge device includes a fixed element with a plate that can be anchored to a stationary supporting structure, and a movable element with a hinge body that can be anchored to a closing element. Adjustment elements for the position of the hinge body and the plate include a pair of opposite longitudinal projections integrally joined to a pin that can be inserted into a slot defined in the plate. A pair of adjustment grub screws at the slot promotes the joined rotation of the longitudinal projections and the pin. The hinge body further includes a seat, for the mutual movement of the pin and of (Continued)

the hinge body, with a damping system interacting by friction with the pin to differentially dampen the rotation of the pin and the hinge body. The hinge device may be fixed to the closing element with a pair of clamping elements.

7 Claims, 11 Drawing Sheets

(51) Int. Cl.

| | |
|---|---|
| ***E05D 7/08*** | (2006.01) |
| ***E05D 11/10*** | (2006.01) |
| ***E05F 1/12*** | (2006.01) |
| ***E05F 1/14*** | (2006.01) |
| ***E05F 3/20*** | (2006.01) |

(52) U.S. Cl.

CPC .................. *E05F 1/14* (2013.01); *E05F 3/20* (2013.01); *E05D 2011/1092* (2013.01); *E05Y 2201/636* (2013.01); *E05Y 2201/638* (2013.01); *E05Y 2600/32* (2013.01); *E05Y 2900/132* (2013.01)

(56) References Cited

U.S. PATENT DOCUMENTS

2006/0242792 A1* 11/2006 Kienle ................ E05D 11/1078 16/252
2007/0228742 A1* 10/2007 Chiang ............... E05D 11/1064 292/163
2014/0075718 A1* 3/2014 Bacchetti ................ E05F 3/104 16/54
2016/0076292 A1* 3/2016 Stuart ................... E05F 1/1215 16/297
2016/0160550 A1* 6/2016 Bacchetti ................ E05D 11/08 16/319
2018/0010376 A1* 1/2018 Beattie ................ E05D 11/1014
2018/0298658 A1* 10/2018 Brun .......................... E05D 3/12
2019/0211602 A1* 7/2019 Stuart ................... E05F 1/1215
2021/0196085 A1* 7/2021 Placencia ............ E05D 11/0054

FOREIGN PATENT DOCUMENTS

EP 1108842 A2 * 6/2001 ........... E05D 5/0246
WO 2017195180 11/2017
WO WO-2017195180 A1 * 11/2017 ......... E05D 11/0054

* cited by examiner

Section II-II, FIG. 1

Section III-III, FIG. 1

S
A
30
10
Y'''
Y

Y
10
200
201
Y'''
30
A
S

A
30
10
Y=Y'''

HINGE FOR THE ROTATABLE MOVEMENT OF A DOOR, A LEAF OR THE LIKE AND SYSTEM FOR FIXING THE LATTER TO A STATIONARY SUPPORTING STRUCTURE

FIELD OF THE INVENTION

The present invention generally regards the technical field of hinges, and it particularly relates to a hinge for the rotary movement of a closing element, such as a door, a leaf or the like, with respect to a supporting structure, for example a floor, a frame or a ceiling, as well as a system for fixing the door, leaf or similar to the supporting structure.

STATE OF THE ART

Hinges for the rotary movement of a closing element, such as a door or leaf, in particular made of glass, with respect to a supporting structure, are known.

Such hinges typically comprise a fixed element anchored to the supporting structure and a movable element anchored to the door, susceptible to mutually rotate with respect to each other.

Examples of such hinges are known from the documents CN1072999801, US2013000079 and AU2012101498.

SUMMARY OF THE INVENTION

An object of the present invention is to at least partly overcome the drawbacks outlined above, by providing a hinge for the rotary movement of a closing element that is highly functional and cost-effective.

Another object of the invention is to provide a hinge that allows the damping of the opening and/or closing of the closing element in a simple manner.

Another object of the present invention is to provide a hinge device that allows a simple adjustment of the closed position of the closing element with respect to the supporting structure to which it is connected.

A further object of the present invention is to provide a system that allows the fixing of a hinge to closing elements of different thicknesses.

Another object of the invention is to provide a hinge with a reduced number of components.

Another object of the invention is to provide a hinge that is easy to assemble.

These and other objects that will be more apparent hereinafter, are attained by a hinge and/or by a fixing system according to what is described and/or claimed and/or illustrated herein.

In a first aspect of the invention, there may be provided for a hinge device for the rotary movement of a closing element, such as a door or the like preferably made of glass, anchored to a stationary supporting structure, preferably a floor, a ceiling or the upper crosspiece of a door frame, the device comprising:

- a fixed element anchorable to the stationary supporting structure;
- a movable element which can be anchored to the closing element;
- wherein one of said movable element or said fixed element includes a hinge body defining a first axis, the other of said movable element or said fixed element comprising a pin defining a second axis substantially perpendicular to said first axis, said hinge body and said pin being rotationally coupled to each other so as to rotate mutually around said second axis between an open position and a closed position, said first and second axes lying on a first plane;
- wherein said fixed element comprises a fixing plate defining a third axis, said fixing plate comprising:
  - a first lower face which can be anchored to the stationary supporting structure, said first lower face comprising a resting surface defining a second plane;
  - an upper face comprising a seat susceptible to house said pin;
- wherein said pin comprises a coupling end, said seat of said fixing plate comprising a bottom wall susceptible to interact or come into contact with said coupling end;
- wherein at least one of said bottom wall and said coupling end is curve-shaped so that said pin and said fixing plate rotate mutually at least around a fourth axis substantially perpendicular to said third axis and substantially parallel to said second plane and/or so that said pin and said fixing plate rotate mutually at least around a fifth axis substantially perpendicular to said second axis and substantially parallel to said first plane;
- so as to allow an operator to adjust the spatial position of said hinge body with respect to said fixing plate.

Advantageous embodiments of the aforementioned solution are recited in the dependent claims.

In a further aspect, irrespectively of the above, there may be provided for a hinge device for the rotary movement of a closing element, such as a door or the like preferably made of glass, anchored to a stationary supporting structure, preferably a floor, a ceiling or the upper crosspiece of a door frame, the device comprising:

- a fixed element anchorable to the stationary supporting structure;
- a movable element which can be anchored to the closing element;
- wherein one of said movable element or said fixed element includes a hinge body defining a first axis, the other of said movable element or said fixed element comprising a pin defining a second axis, said hinge body and said pin being rotationally coupled to each other so as to rotate mutually around said second axis between an open position and a closed position;
- wherein said hinge body includes a seat for said pin, one of said seat and said pin including damping means cooperating with the other of said pin and said seat to dampen—in a differentiated manner—the mutual rotation of said hinge body and said pin.

In a further aspect, irrespectively of the above, there may be provided for a system for the fixing of a closing element, such as a door or the like preferably made of glass, to a stationary supporting structure, preferably a floor, a ceiling or the upper crosspiece of a door frame, the device comprising:

- at least one pair of clamping elements positioned on opposite sides with respect to the closing element to lock it;
- at least one hinge device interposed between said clamping elements, said at least one hinge device comprising:
  - a fixed element anchorable to the stationary supporting structure;
  - a movable element which can be anchored to the closing element;
  - wherein one of said movable element or said fixed element includes a hinge body defining a first axis, the other of said movable element or said fixed element comprising a pin defining a second axis substantially perpendicular to said first axis, said hinge body and said pin being rotationally coupled to each other so as to rotate mutually around said second axis between an open position and a closed position;

wherein said fixed element comprises a fixing plate defining a third axis, said fixing plate comprising a lower face which can be anchored to the stationary supporting structure and an upper face comprising a seat susceptible to house said pin;

wherein the system further comprises means for the mutual coupling of said clamping elements;

wherein said hinge body is of the box-like type with an upper surface, each of said clamping elements comprising a lower surface facing said upper surface of said hinge body, and preferably resting thereon.

In a further aspect, irrespectively of the above, there may be provided for a hinge device for the rotary movement of a closing element, such as a door or the like preferably made of glass, anchored to a stationary supporting structure, preferably a ceiling or the upper crosspiece of a door frame, the device comprising:

a fixed element anchorable to the stationary supporting structure;

a movable element (3) which can be anchored to the closing element;

wherein one of said movable element or said fixed element includes a hinge body defining a first axis, the other of said movable element or said fixed element comprising a pin defining a second axis substantially perpendicular to said first axis, said hinge body and said pin being rotationally coupled to each other so as to rotate mutually around said second axis between an open position and a closed position;

wherein said fixed element comprises a fixing plate defining a third axis, said fixing plate comprising a first face which can be anchored to the stationary supporting structure and a second opposite face comprising a seat susceptible to house said pin;

wherein said fixing plate comprises at least one rear fixing hole and at least three front fixing holes mutually positioned and selectively engageable so that the axis defined by the rear fixing hole and by the hole engaged between said at least three front fixing holes coincides or does not coincide with said third axis, so as to allow the operator to fix left and right swing doors as well as free doors.

BRIEF DESCRIPTION OF THE DRAWINGS

Further characteristics and advantages of the invention will be more apparent in light of the detailed description some preferred but non-exclusive embodiments of the invention, illustrated by way of non-limiting example with reference to the attached drawings, wherein.

DETAILED DESCRIPTION OF SOME PREFERRED EMBODIMENTS

With reference to the aforementioned figures, herein described is a hinge 1 for the rotary movement of a closing element A, such as a leaf, a door, or the like, preferably made of glass, with respect to a stationary supporting structure S, such as a wall, a floor, a frame or the like.

Preferably, the closing element A may be a glass door defining a plane $\pi$, while the stationary supporting structure S may be a floor, a ceiling or the upper part of the door sub-frame.

Even though hereinafter reference will be made to a door A and a floor S, it is understood that the closing element and the stationary supporting structure may vary without departing from the scope of protection of the attached claims.

The present invention can include various parts and/or similar or identical elements. Unless otherwise specified, similar or identical parts and/or elements will be indicated using a single reference number, it being clear that the described technical features are common to all similar or identical parts and/or elements.

In the present description, FIGS. 1 to 6B illustrate a first embodiment of the hinge 1 and of the relative fixing system 4 thereof to the door A, while FIGS. 7 to 11 illustrate a further embodiment thereof. Where not otherwise specified, it is intended that the characteristics mentioned in the following description are common to both embodiments.

The door A can rotate between at least one closing position and at least one opening position.

Figure 3A:
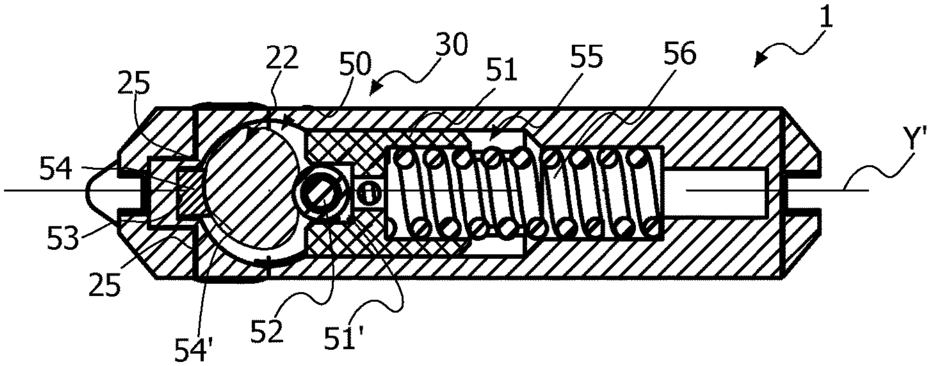
FIGS. 3A and 3B are cross-sectional views along a plane I-I of FIG. 1 wherein a door A is in one of the open and closed positions, respectively.
Figure 3B:
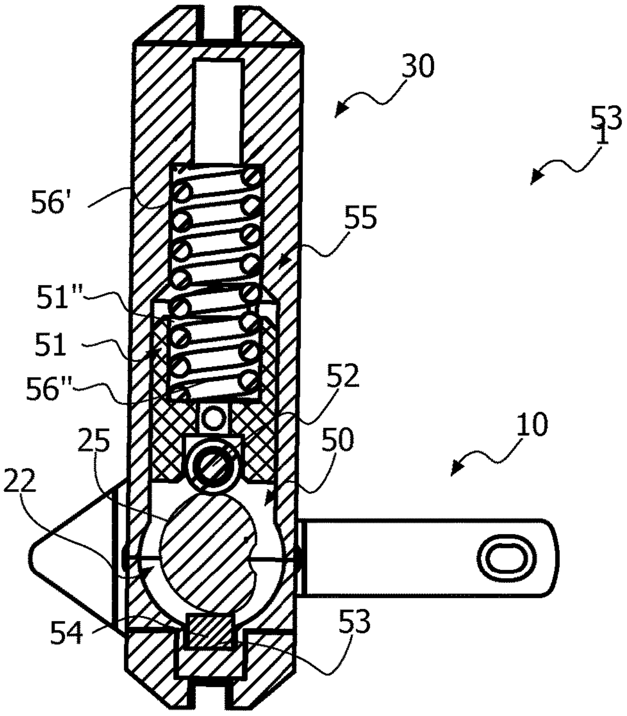

As particularly illustrated in FIGS. 3A-3B, the hinge 1 can be a hinge of the mechanical type, i.e. without hydraulic damping means.

According to a preferred but non-exclusive embodiment, the hinge 1 may be a hinge for swing doors A.

Such hinge 1 may comprise a fixed element 2 which can be anchored to the floor or to ceiling and a movable element 3 which can be anchored to the door A.

Preferably, the movable element 3 may include a hinge body 30 defining an axis Y'.

Figure 2:
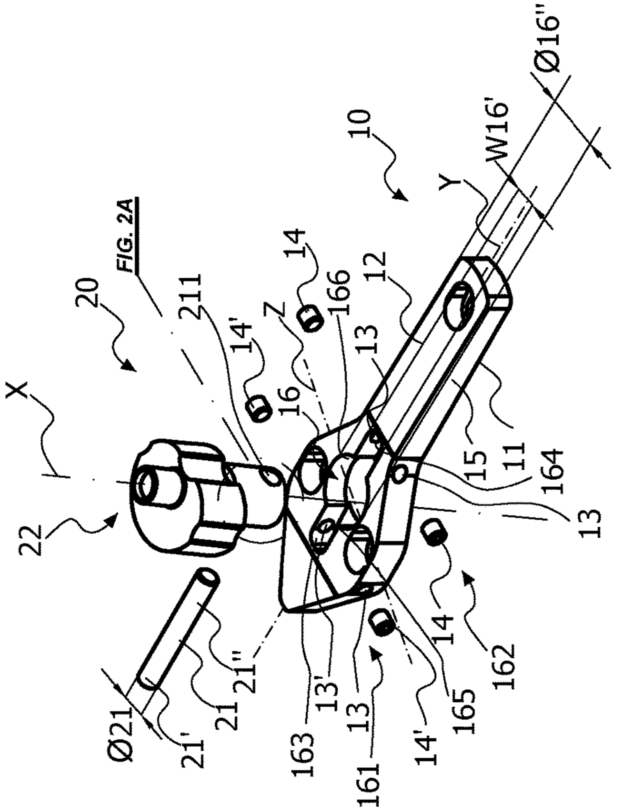

As shown in particular in FIG. 2, the fixed element 2 may comprise a plate 10 which can be anchored to the floor and a pin 20, coupled to each other.

Suitably, the hinge body 30 and the pin 20 can be coupled so as to mutually rotate around a longitudinal axis X to define the opening and closing positions of the door A.

It is clear that the fixed element 2 may include the hinge body 30, while the movable element 3 may comprise the pin 20 without departing from the scope of protection of the attached claims.

Preferably, the pin 20 can define the rotation axis X, and it may comprise a body 27 with a cam element 22.

The body 27 may further comprise a coupling zone 23 suitable for coupling the pin 20 and the plate 10.

Preferably, the pin 20 may comprise a pair of opposite longitudinal projections 21', 21" positioned at the coupling zone 23 and preferably extending perpendicularly with respect to the axis X, along an axis Y".

According to a preferred but non-exclusive embodiment, said opposite longitudinal projections 21', 21" may correspond to the ends of a substantially cylindrical pin 21 integrally joined to the pin 20 and protruding therefrom.

Preferably, said pin 21 can be inserted into a through hole 211 of the coupling zone 23 of the pin 20. This embodiment is particularly simple to implement.

Even though hereinafter reference will be made to a through pin, it is clear that the opposite longitudinal projections 21', 21" can be made as a single piece with the pin without departing from the scope of protection of the attached claims.

Furthermore, the coupling zone 23 of the pin 20 may include a curved coupling end 24.

In particular, the curved coupling end 24 may be substantially a spherical cap having a diameter $\phi$24.

Suitably, the plate 10 may have a substantially longitudinal extension along an axis Y and it may include a surface 11' for contact with the stationary supporting structure S defining a plane $\pi$" substantially coincident with the floor or ceiling plane.

In order to anchor the plate 10 to the latter, suitable fixing sleeves 100 passing through elongated slots 101 may be provided for.

The plate 10 may comprise two opposite faces 11 and 12, the first of which may be anchored to the floor or to ceiling.

It may also comprise a pair of opposite side faces 15.

Figure 1:
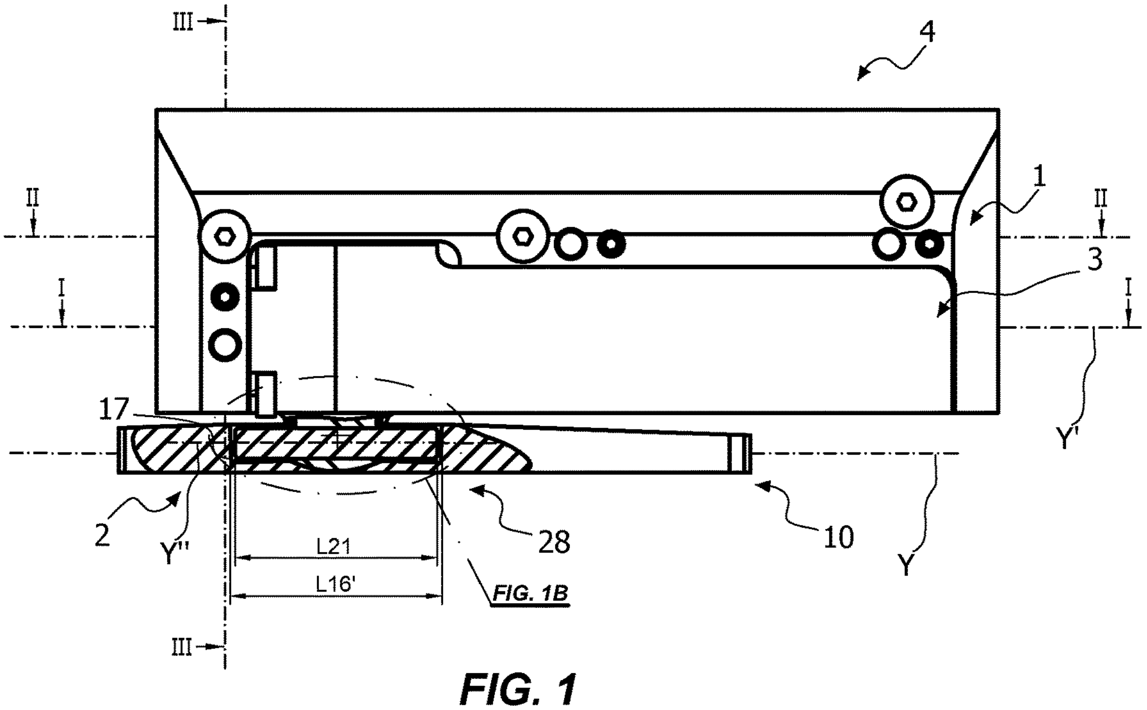
FIG. 1 is a front view of a first embodiment of the hinge device 1 and of the relative fixing system 4.

As particularly illustrated in FIGS. 1-2, the face 12 may comprise a seat 16 suitable to receive the coupling zone of the pin 20.

To this end, the seat 16 may have a central portion 16" suitable to receive the curved coupling end 24 and a pair of longitudinal portions 16' suitable to receive the opposite longitudinal projections 21', 21".

It is clear that the seat 16 may have only the central portion 16" without the longitudinal portions 16' without departing from the scope of protection of the attached claims.

It is also clear that the seat 16 may have the central portion 16" and only one of the longitudinal portions 16' without departing from the scope of protection of the attached claims.

It is clear that the central portion 16" of the seat 16 may have such a geometry such to receive the curved coupling end 24. Such geometry may vary, for example it may be cylindrical, parallelepiped or the like, provided that it is suitable to perform the latter function.

The upper opening 16''' of the central portion 16" of the seat 16 may have dimensions and/or configuration such to allow the passage of the curved coupling end 24. For example, it may be rectangular, square, circular or oval-shaped.

On the other hand, the bottom wall 16"" of the central portion 16" of the seat 16 may have dimensions and/or configuration such to allow the curved coupling end 24 to rotate. For example, it may be flat, convergent or curved. Possibly, the central portion 16" the seat 16 may also be without a bottom wall 16"".

Preferably, the portion 16" may have a shape substantially complementary to that of the curved coupling end 24. Therefore, it may be substantially spherical cap-shaped and have a diameter $\phi$16" measuring substantially equal to or slightly greater than the diameter $\phi$24.

It is clear that the aforementioned embodiments are provided solely by way of non-limiting examples of the invention.

Figure 1B:
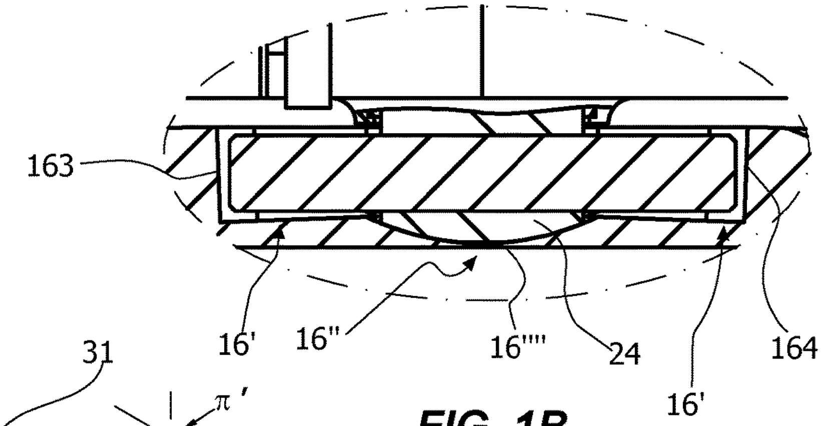
FIG. 1B is an enlarged view of some details of FIG. 1.
Figure 1A:
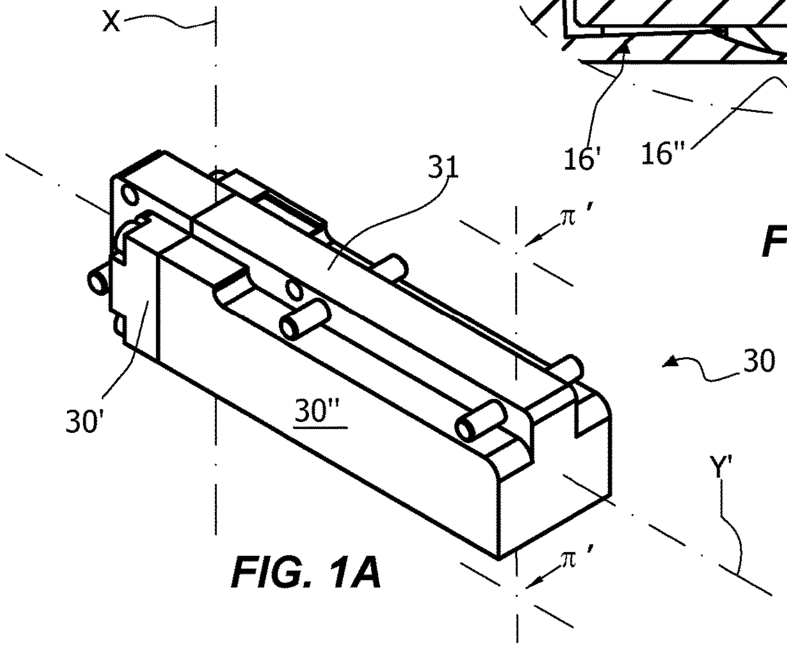
FIG. 1A is a top view of the hinge 30.
Figure 2A:
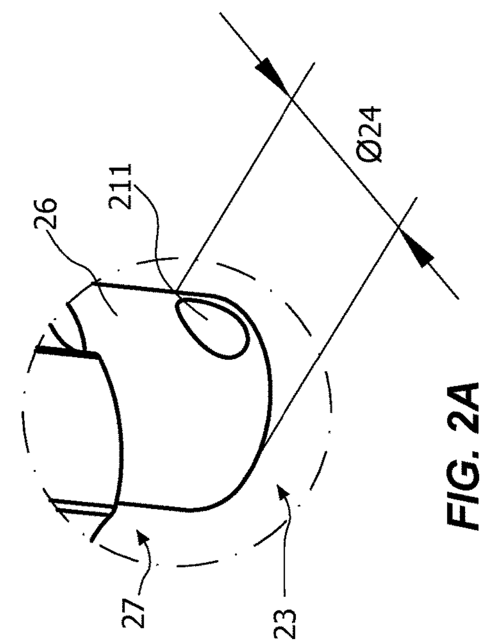
FIG. 2 is an axonometric view of the pin 20 and of the fixing plate 10, with FIG. 2A showing some enlarged details.
Figure 1D:
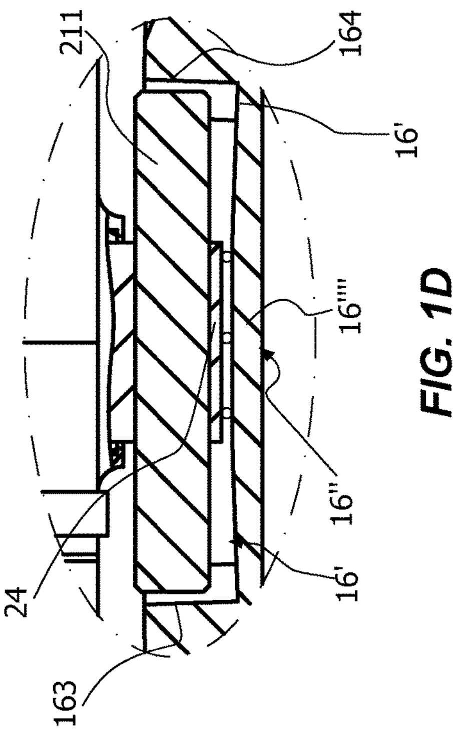
FIGS. 1C and 1D are enlarged views of some details of FIG. 1, in alternative embodiments.
Figure 1C:
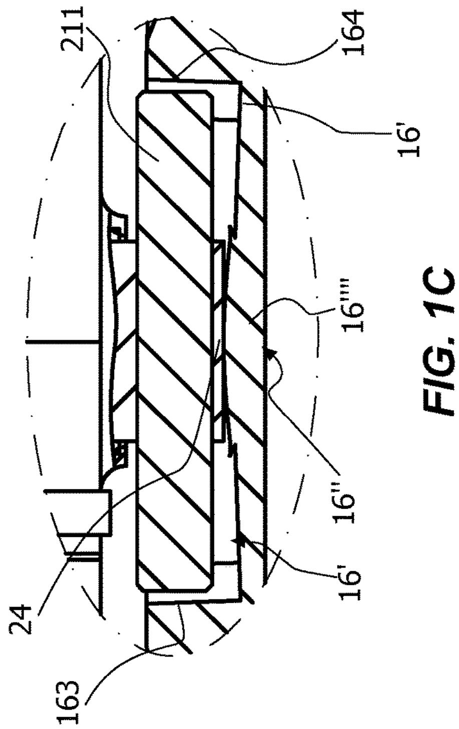

For example, as illustrated in FIG. 1C, the bottom wall 16"" of the central portion 16" of the seat 16 may have a curved shape, and in particular a spherical cap, while the coupling end 24 may be flat or of any other shape, provided that it is suitable to rotate on the bottom wall 16"".

Optionally, both the bottom wall 16"" of the central portion 16" of the seat 16 and the coupling end 24 may be curved, for example spherical cap-shaped.

Furthermore, for example as illustrated in FIG. 1D, one or more curved or spherical interface elements may be provided between the bottom wall 16"" of the central portion 16" of the seat 16 and the coupling end 24, even though none of them are curved or spherical-shaped.

In general, at least one of the bottom wall 16"" of the central portion 16" of the seat 16 or the coupling end 24 may be curved or spherical, without departing from the scope of protection of the attached claims.

It is also clear that the seat 16 may have an inner surface which includes or consists of the bottom wall 16"". For example, in the case of a spherical cap-shaped seat 16, the inner surface may consist of the bottom wall 16"".

Preferably, as illustrated in FIG. 1B, the distance L16' between the opposite bottom surfaces 163, 164 of the portions 16' may be substantially equal to or slightly greater than the length L21 of the pin 21.

Preferably, each portion 16' may have a width W16' slightly greater than the diameter $\phi$21 of the pin 21, so that the latter is movable inside the former.

In particular, each portion 16' may comprise a pair of facing side surfaces 165, 166 parallel to the plane $\pi$ having a distance defined by the width W16'.

Each portion 16' may also comprise a bottom surface 17. Possibly, said bottom surfaces 17 may be substantially flat, like in the embodiment shown in FIGS. 7 to 11, or inclined defining substantially converging axis with respect to the axis X, like in the embodiment shown in FIGS. 1 to 6B.

The dimensions illustrated above may be such as to allow the suitable movement of the pin 20 inside the seat 16, for example as illustrated in FIGS. 10B-10E.

When such movements are carried out, the ends 21', 21" and the surfaces 163, 164 and/or the ends 21', 21" and the surfaces 165, 166 may possibly come into contact with each other.

Thanks to the above, the assembly between the pin 21 and the curved coupling end 24 of the pin 20 and the elongated slot 16 may act as adjustment means 28 for adjusting the spatial position of the hinge body 30 with respect to the fixing plate 10.

Furthermore, the slots 101 may act as means for adjusting the relative position of the fixing plate 10—hinge body 30 assembly with respect to the stationary supporting structure S.

This will allow to precisely adjust the position of the door A with respect to the stationary supporting structure.

Such adjustment will be carried out along various directions, as particularly illustrated in FIGS. 10A-10E.

Figure 10A:
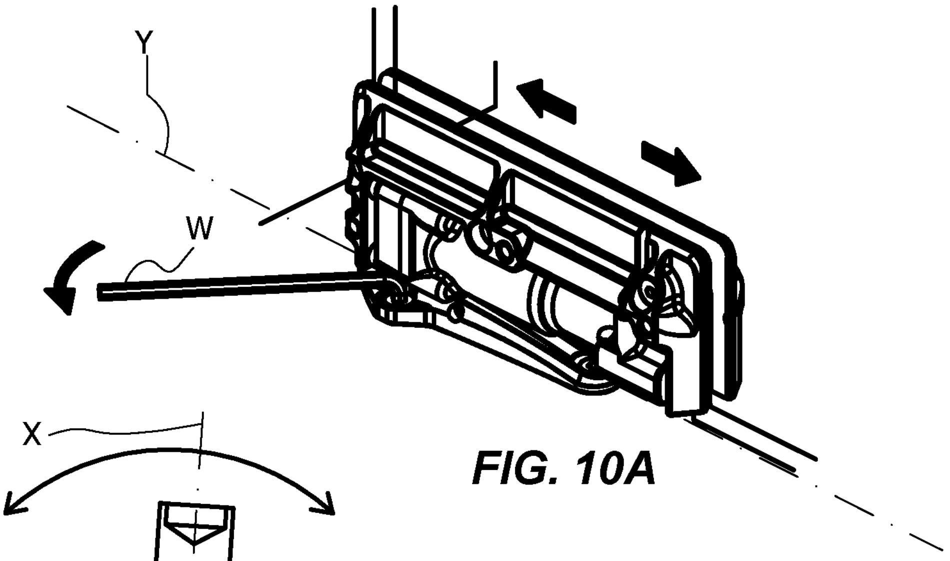
FIGS. 10A to 10E are schematic axonometric views showing the various possibilities of adjustment of the fixing system.

As particularly illustrated in FIG. 10A, loosening and subsequently tightening the pins 100' of the sleeves 100 using a special wrench W actually allows to promote the translation of the fixing plate 10 along the axis Y, so as to move the fixing plate 10 with respect to the floor or ceiling. The length of this translation will be defined by the length of the elongated slots 101.

Figure 10B:
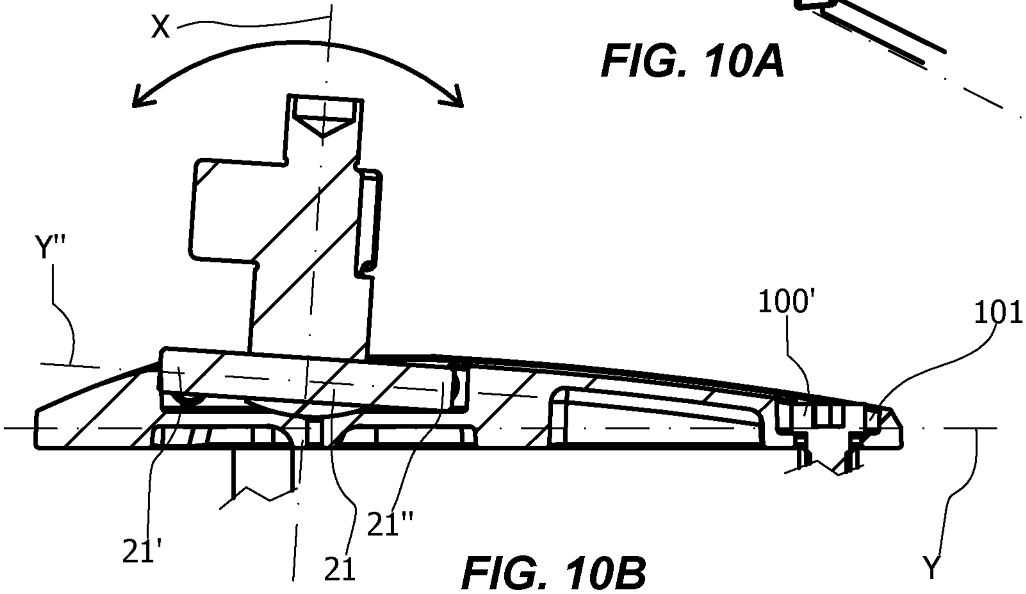
Figure 10C:
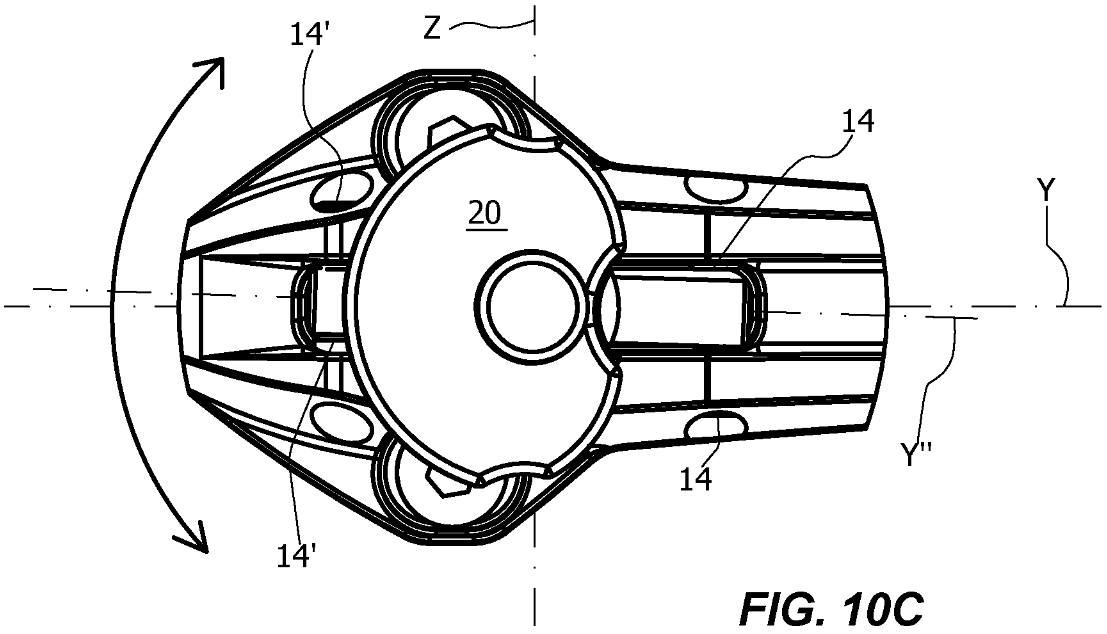
Figure 10D:
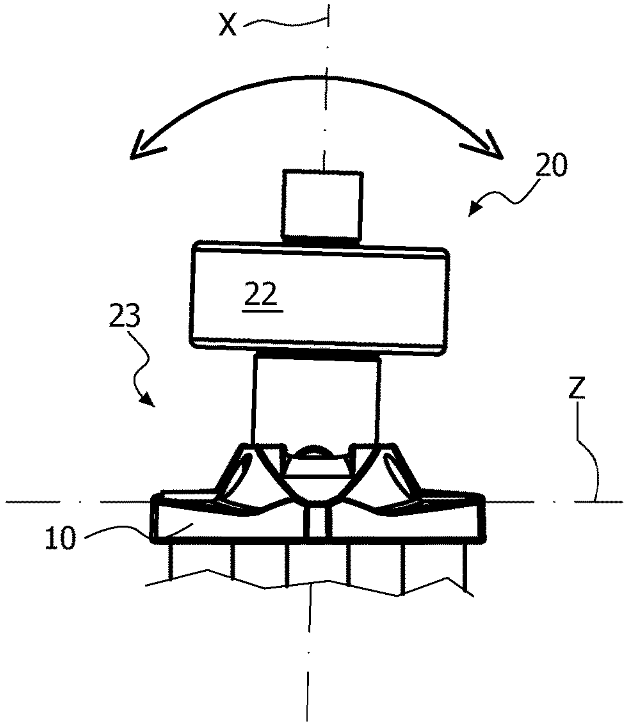

As particularly illustrated in FIGS. 10B and 10D, exploiting the particular shape of the curved coupling end 24 of the pin 20 and of the central portion 16' the seat 16 also allows to promote respectively the rotation of the pin 20 around an axis Z perpendicular to the axis Y and around the axis Y" defined by the pin 21.

As particularly illustrated in FIG. 10C, the dimensional relationship between the pin 21 and the portions 16' of the seat 16, also allows to promote the rotation of the pin 20 around its axis X.

This particular geometry of the curved coupling end 24 of the pin 20 and of the central portion 16" of the seat 16, also allows to create the aforementioned movements, so that the pin 20—hinge body 30 assembly can be adjusted in various positions.

The adjustment means 28 may suitably comprise two pairs of adjustment grub screws 14, 14'.

The latter may be arranged at the opposite ends 161, 162 of the seat 16. More particularly, the adjustment grub screws 14, 14' may be inserted through the surfaces 165, 166, so as to interact against the pin 21 arranged in the seat 16.

This will allow to promote the rotation of the pin 20 around the axis X thereof.

The pairs of adjustment grub screws 14, 14' may suitably be inserted into respective internally threaded holes 13, 13'. The latter may be formed in two-by-two on the opposite faces 15 of the plate 10.

This will allow to guide the movement of the pin 21 in the seat 16 in a highly precise manner.

Figure 10E:
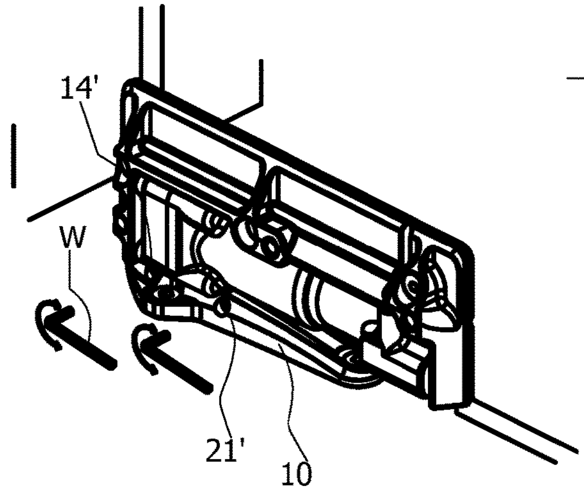

As particularly illustrated in FIG. 10E, the grub screws 14, 14' and the threaded holes 13, 13' may also act as stop means for locking the movement of the pin 21 once the spatial position of the hinge body 30 has been adjusted with respect to the plate 10.

It is clear that the adjustment means 28 may comprise a single pair of adjustment grub screws, which can be coupled to a single pair of threaded holes preferably made in an opposite position with respect to the axis Y on the side surfaces 15 of the plate 10, without departing from the scope of protection of the attached claims.

As particularly illustrated in FIGS. 12 to 15C, the upper hinge 1 may also include a hinge body 30 and a pin 20 mutually coupled to rotate round a rotational axis. A fixing plate 10 which can be fixed to the upper part of the door frame or to the ceiling by means of dowels 100, may be connected to the pin.

Such fixing plate 10 may suitably include a rear hole 200 and three adjacent front holes 201.

Figures 15A, 15B, 15C:
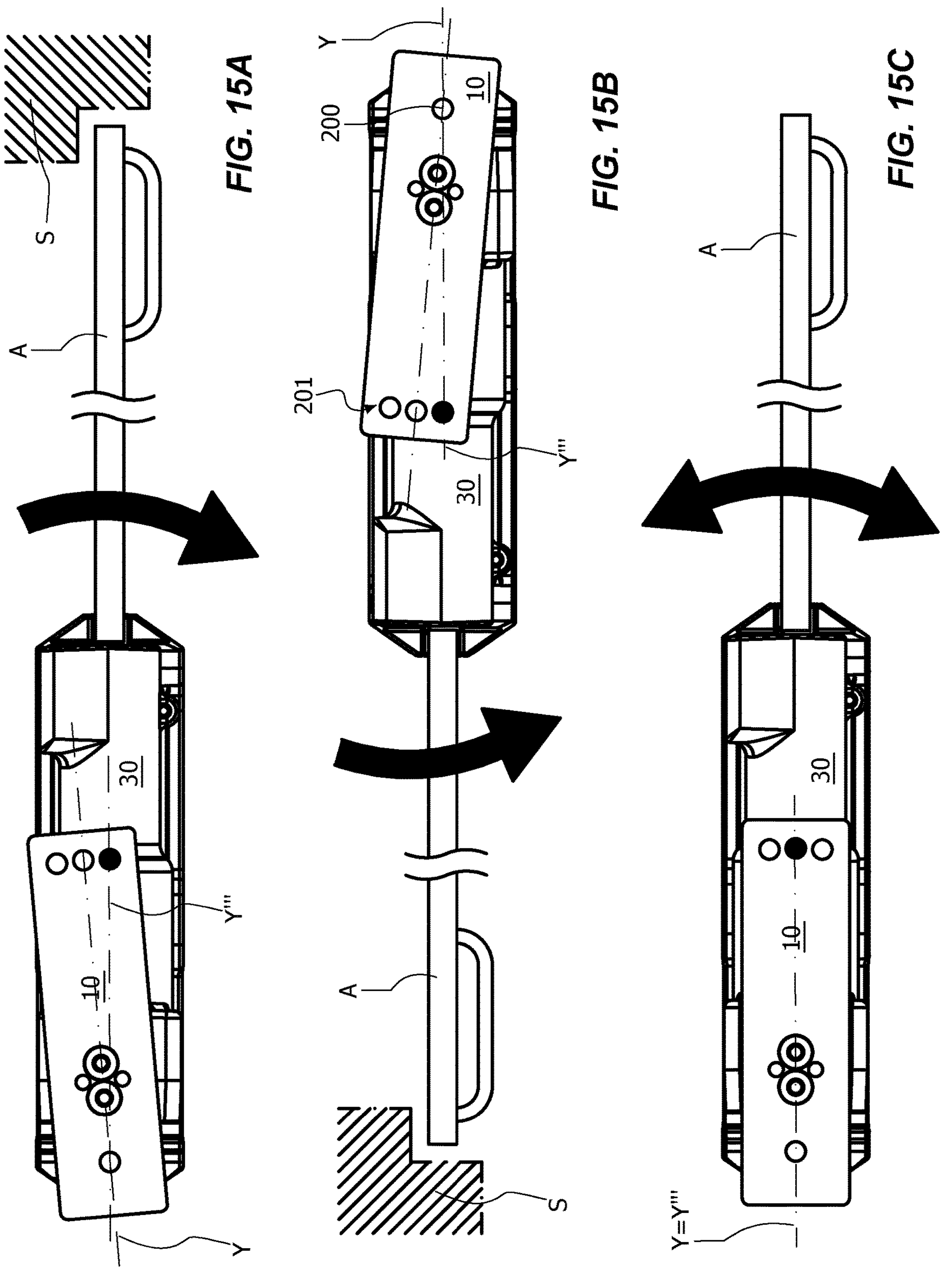
FIGS. 15A, 15B and 15C are schematic axonometric views of the positioning of the fixing plate 10 of the upper hinge 1 to the ceiling or to the upper upright of a frame of the door A in the case of a swing door respectively with opening to the right, swing door with opening to the left and free door without leaf.

This configuration of the fixing plate 10 will allow to change the type of the door A without having to drill the wall and without changing the hinge, but rather simply by unscrewing the pin 100' of the front sleeve 100 from one of the adjacent holes 201 and by inserting it back into another of the holes 201, as illustrated in FIGS. 15A to 15C.

In particular, FIG. 15A illustrates the positioning of the fixing plate 10 in the case of a swing door with opening to the right, FIG. 15B shows the positioning of the fixing plate 10 in the case of a swing door opening to the left and FIG. 15C illustrates the positioning of the fixing plate 10 in the case of a free door without a leaf.

Advantageously, the positioning of the fixing plate 10 according to FIGS. 15A and 15B allows to pre-load the hinge 1 without acting on the mechanical part thereof.

According to a further aspect of the invention, the hinge body 30 may be substantially box-shaped and it may can comprise an upper surface 31 having a predefined width L31.

Figure 4:
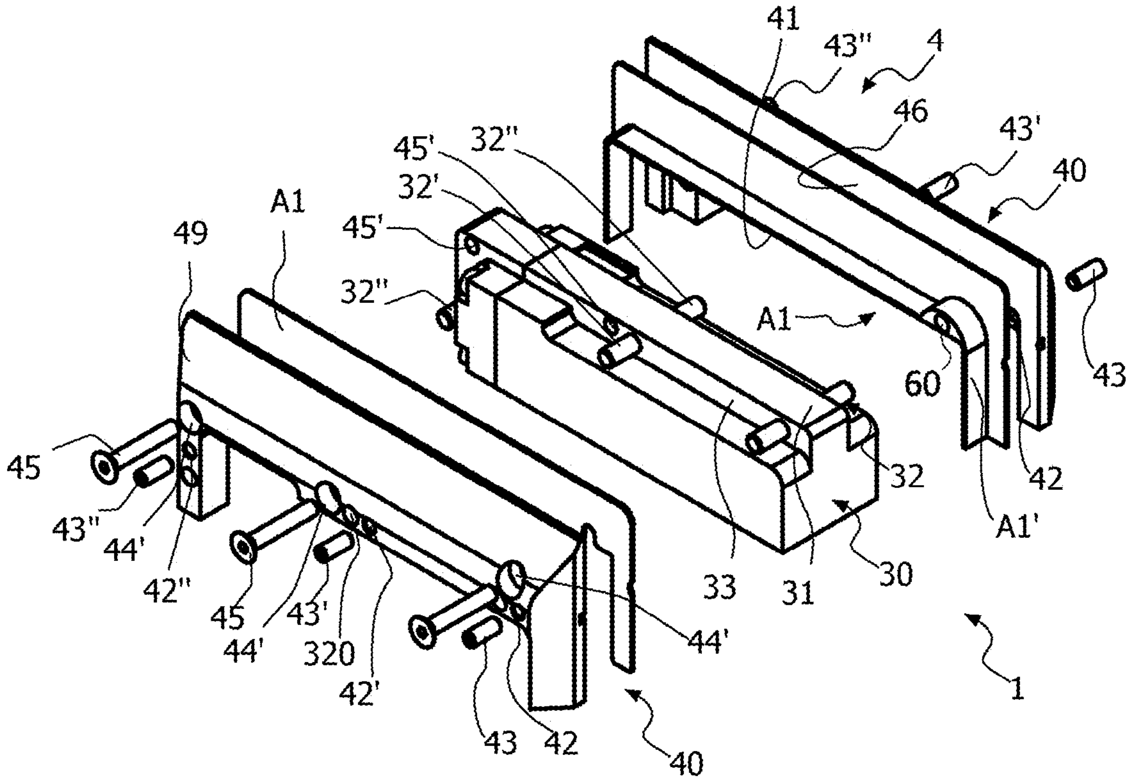
FIG. 4 is an exploded axonometric view of the embodiment of the illustrated hinge device 1 and of the relative fixing system 4 of FIG. 1.
Figure 5:
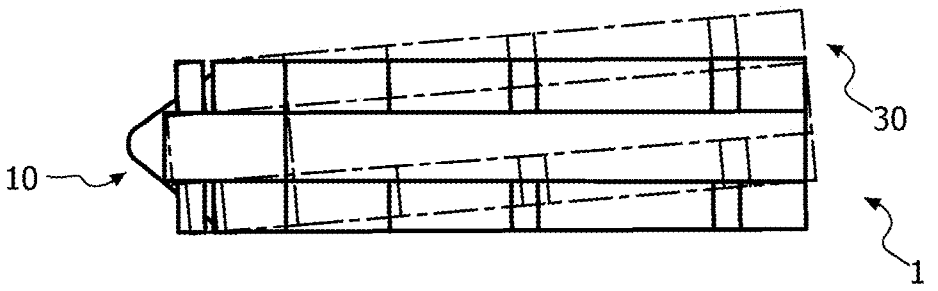
FIG. 5 is a top view of the hinge 1 of FIG. 4 when adjusting the spatial position of the hinge body 30 with respect to the plate 10.

Furthermore, the hinge body 30 may comprise a pair of side surfaces 33 opposite to and adjacent with respect to the sliding surface 31, as illustrated in particular in FIG. 4.

In a preferred but non-exclusive embodiment, the hinge body 30 can consist of two half-shells 30', 30", which can be coupled to each other by sliding along the axis Y' with the interposition of the pin 20.

For example, the hinge body 30 can be made according to the disclosures of international application WO2017/195180 in the name of the Applicant in question, to which reference shall be made for perusal.

The hinge body 30 may suitably comprise a seat 50 for the insertion of the pin 20 inside thereinto.

In addition, the hinge body 30 may comprise a working chamber 55 defining the axis Y'.

The working chamber 55 may comprise a slider element 51 slidable therein between two end-stroke positions defining the opening and closing of the door A.

The slider element 51 may include a housing zone 51' in which a cam follower element 52 and an opposite housing zone 51" may be inserted.

The cam follower element 52 may be substantially spherical or cylindrical and it may come into mutual contact with the cam element 22.

It is clear that the working chamber 55 may also comprise elastic counteracting means, such as for example a spring 56, for promoting the automatic opening or closing of the door A, promoting the passage from one to the other of the end-stroke positions of the plunger 51.

Said spring 56 may comprise two opposite ends 56', 56" one of which may be inserted into the housing zone 51".

Preferably, the seat 50 may comprise damping means 54 interacting with the abutment surface 25 of the cam element 22.

The damping means 54, in cooperation with the eccentricity that is specific to the cam element 22, may suitably dampen—in a differentiated manner—the rotation of the fixed 2 and movable 3 elements around the axis X.

The damping means 54 may preferably have a contact surface 54' at contact with the abutment surface 25 of the cam element 22.

Figure 3C:
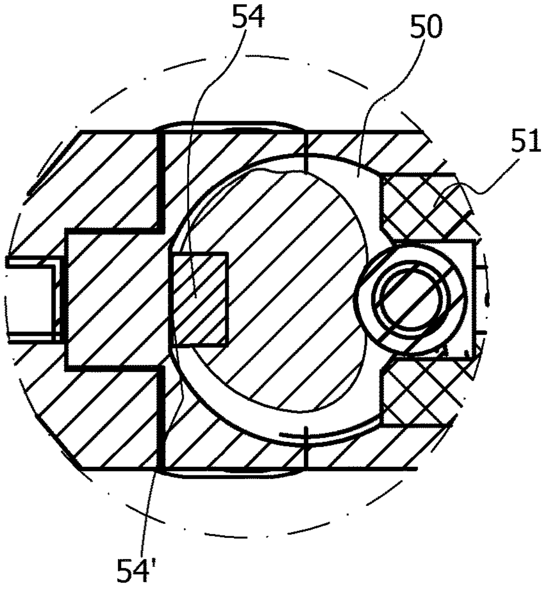
FIG. 3C is an enlarged view of some details of FIG. 3A, in an alternative embodiment.

It is clear that the damping means may be an integral part of the pin 20 or coupled therewith and interact with an inner wall of the chamber 50, as shown for example in FIG. 3C, without departing from the scope of protection of the attached claims.

In particular, the damping means 54 may comprise or consist of a polymer element, for example of flat or parallelepiped-shaped.

In particular, a polymer with high elasticity, high resistance to abrasion, tearing and permanent deformation caused by the friction forces generated by the interaction between the polymer element 54 itself and the surface 25 of the cam 22 may be used.

Advantageously, the material of the polymer element 54 may be an elastomer.

More particularly, the polymer element 54 may be a polyurethane elastomer with a hardness of between 60 Sh A and 100 Sh A, preferably between 80 Sh A and 95 Sh A.

For example, the elastomer may be Vulkollan®.

Preferably, the seat 50 may comprise a wall 53 facing the working chamber 55 to which the polymer element 54 is coupled.

This will allow to optimize differentiated damping action generated by the interaction between the polymer element 54 and the surface 25.

The hinge 1 can be fixed to the stationary supporting structure S, for example to a floor, a ceiling or to the upper part of a frame, by means of a suitable fixing system 4, as will be described in greater detail hereinafter.

Figure 7:
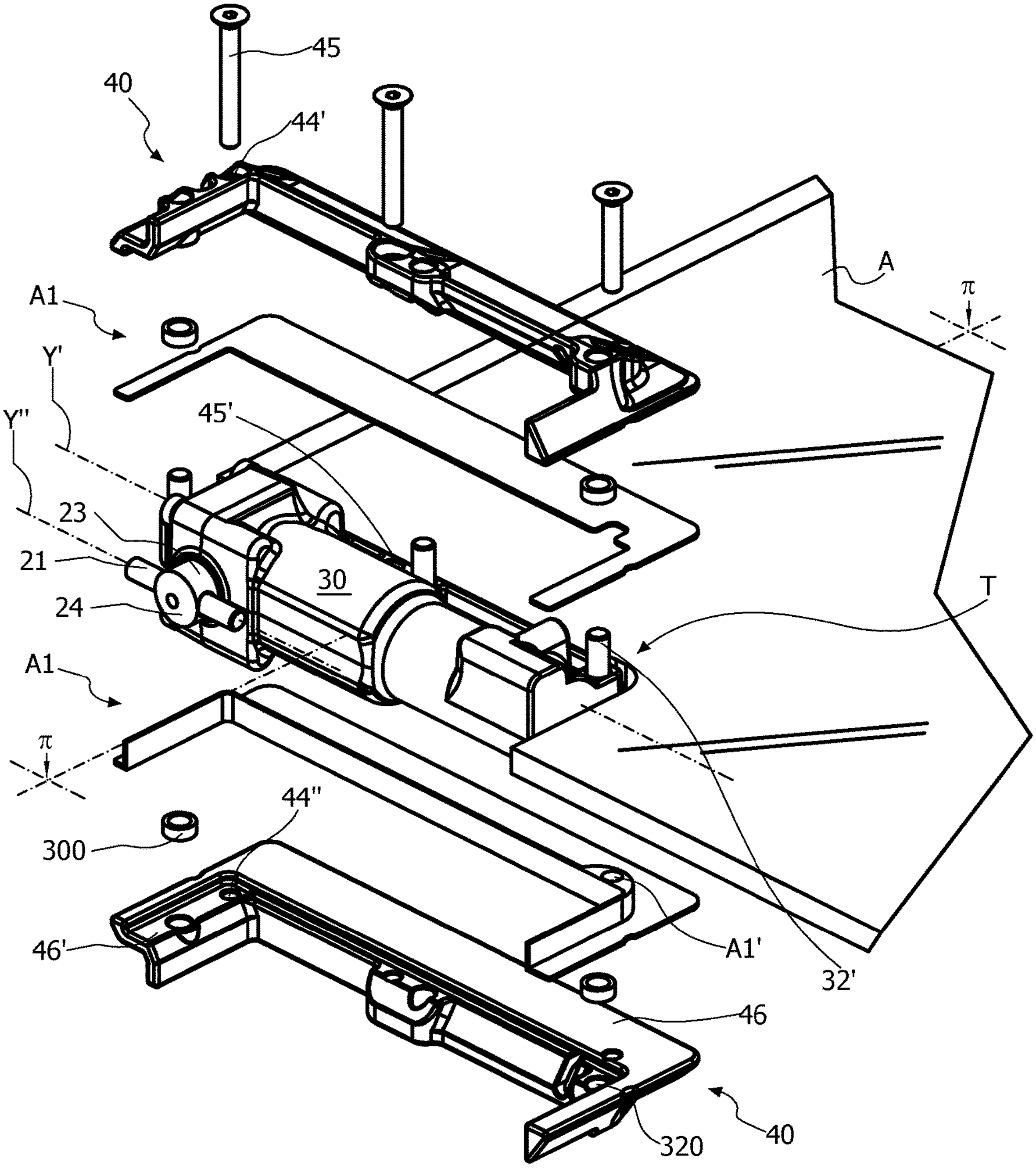
FIG. 7 is a partially exploded schematic view of the fixing of a further embodiment of the hinge 1 to a door A.
Figure 8:
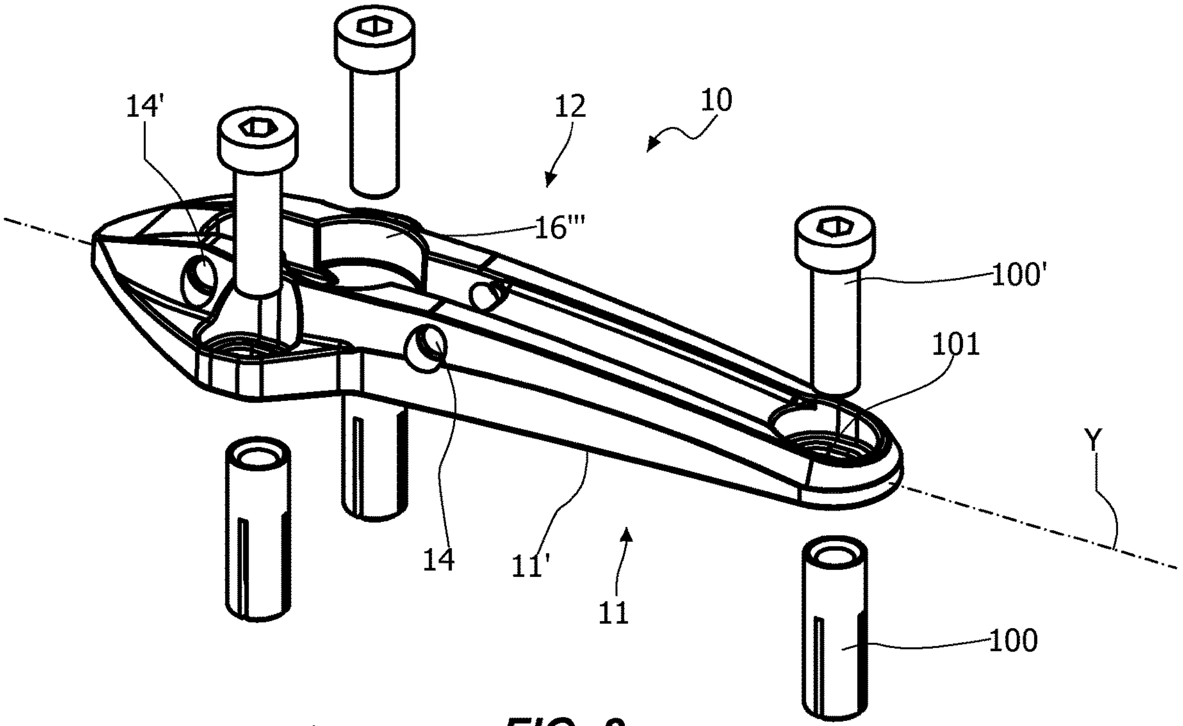
FIG. 8 is an axonometric view of a further embodiment of the fixing plate 10 with the relative fixing sleeves 100.
Figure 9:
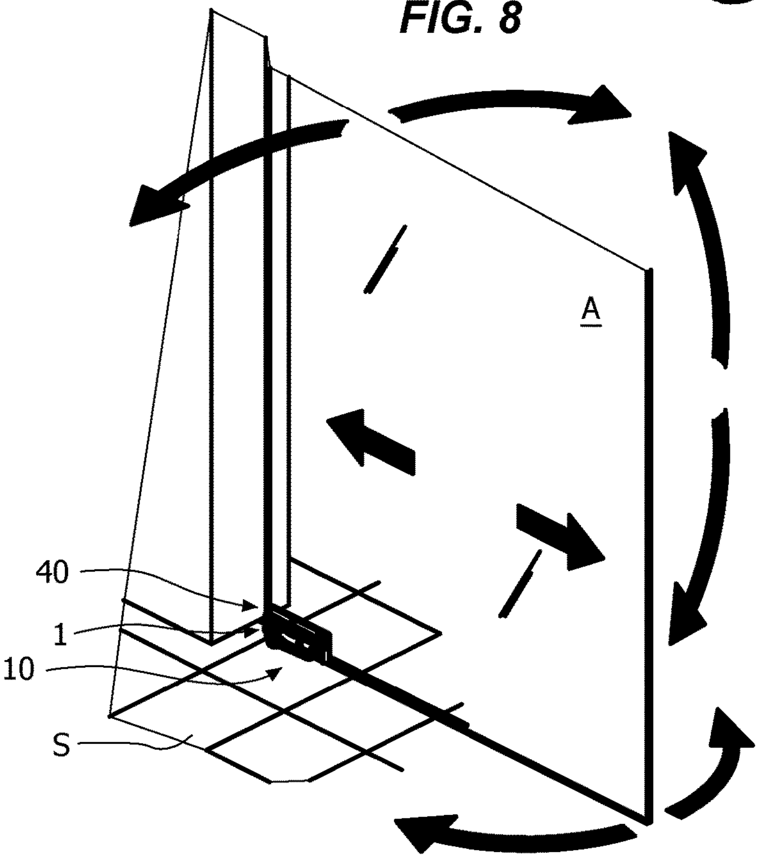
FIG. 9 is a schematic axonometric view of the embodiment of the hinge 1 of FIG. 8 fixed to the supporting structure 5.

For example, as illustrated in FIG. 7, the fixing system 4 may comprise the hinge 1 and a pair of clamping elements 40, designed to lock the door A on opposite sides. To this end, suitable substantially rectangular pockets T may be provided on the door A in a per se known manner.

Each of the clamping elements 40 may comprise a first inner side surface 46 suitable to remain facing the door A, a second inner side surface 46' suitable to remain facing the hinge body 30, an outer side surface 49 and a lower surface 41 facing the hinge body 30.

In the case of glass doors, an interface element A1 made of polymeric or elastomeric material may be arranged in a per se known manner between each clamping element 40 and the glass surface.

The clamping elements 40 may suitably be coupled to each other by means of coupling means 48 so that the door A remains integrally joined interposed between them.

Advantageously, the distance d between the side surfaces 46 may vary according to the thickness s of the door A.

This will allow to support doors A of different thicknesses s having a substantially smaller, equivalent to greater size with respect to the width L31 of the sliding surface 31.

The door A may also suitably rest on the sliding surface 31 of the hinge body 30.

In this manner, the weight of door A may contribute toward anchoring it to the floor.

The coupling means 48 may be defined by screw and nut screw means 45, 44".

In particular, screws 45 may be provided passing through the through hole 44', which may be entirely smooth, of a first clamping element 40 to engage the corresponding nut screw provided inside the hole 44" of the other clamping element 40.

Advantageously, in order for each screw 45 to engage in the corresponding threaded hole 44", it must pass the hinge body 30.

To this end, one of the screws 45 can pass above the surface 31 and through the hole A1' made on the interface element A1. To this end, the pocket T may provide for a suitable passage for the screw 45.

The other screws 45 can also pass through suitable smooth holes 45' passing through the hinge body 30.

However, it is clear that the coupling means 48 may comprise a single screw, which can be screwed into a single nut screw, without departing from the scope of protection of the attached claims.

In order to guide the movement of the clamping elements 40, suitable guiding and centering means may be provided for when the screws 45 are screwed in and when centering the clamping elements 40 with respect to the hinge body 30.

In a preferred but non-exclusive embodiment, said guide and centering means may comprise one or more male elements, for example elongated elements 32', 32" protruding from the side surfaces 33 of the hinge body 30 to engage in corresponding female seats, for example guide and centering holes 320 provided on the clamping elements 40.

According to a preferred but non-exclusive embodiment, the elongated elements 32', 32" can be provided symmetrically with respect to a plane symmetry π' passing through the axis Y'.

However, it is clear that only one of the side surfaces 33 of the hinge body 30 may include one or more male elements without departing from the scope of protection of the attached claims.

Furthermore, it is clear that the one or more male elements may be provided at one or both of the second surfaces 46' and the female seats on the hinge body without departing from the scope of protection of the attached claims.

Furthermore, it is clear that the hinge body and the clamping elements may include male and female elements.

Figure 6A:
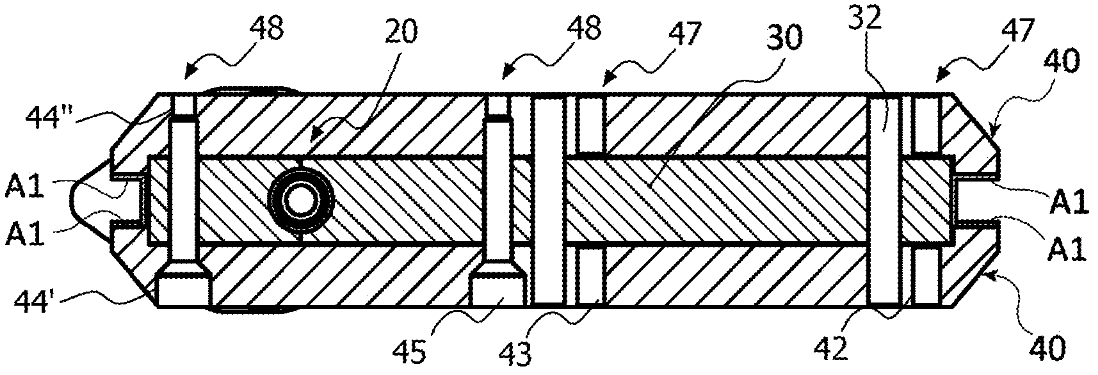
FIG. 6A is a cross-sectional view along a plane II-II of FIG. 1.
Figure 6B:
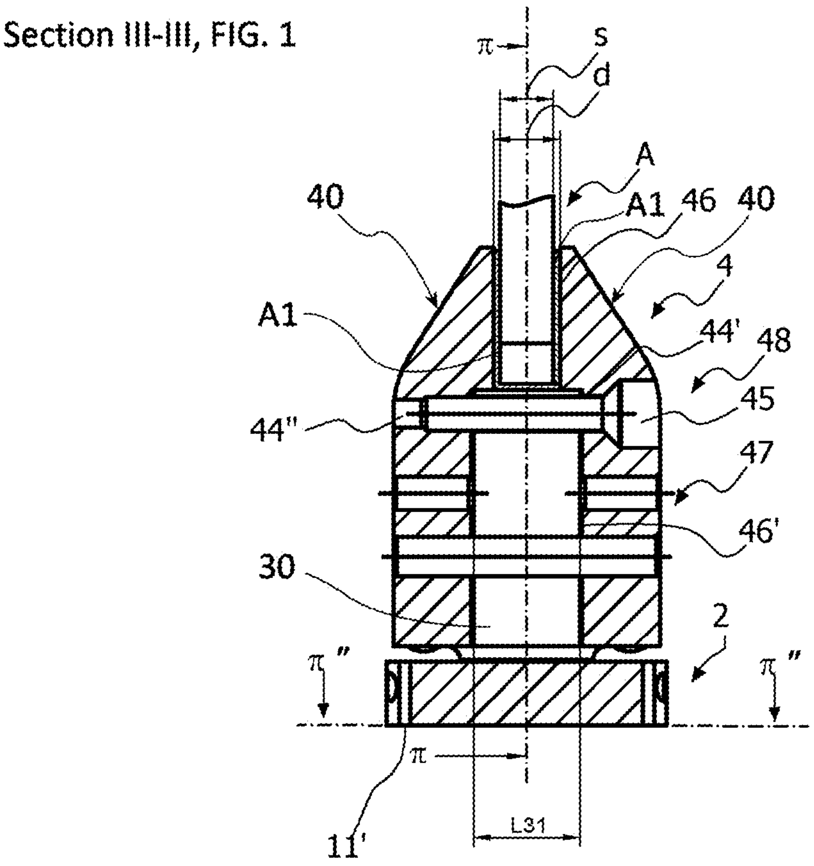
FIG. 6B is a sectional view along a plane III-III FIG. 1.

Preferably, as particularly visible in FIGS. 6A and 6B, the elongated elements 32', 32" may be provided by means of pins 32 passing through the hinge body 30 and received in openings 60. This will allow to provide the elongated elements 32', 32" in a simple and cost-effective manner.

Once the clamping elements 40 have been mutually coupled and the door A locked between them, the hinge body 30 will have to be locked with respect to the clamping elements 40 by means of suitable locking means 47.

To this end, in a preferred but non-exclusive embodiment illustrated for example in FIG. 7, the locking means 47 may include or consist of annular spacers 300 which can be inserted onto the elongated elements 32', 32" to remain interposed between the hinge body 30 and the clamping elements 40.

One or more spacers, which can have a length at least equal to the distance between the second inner side surfaces 46' and the opposite side surfaces 33 of the hinge body 30, may be inserted on the elongated elements 32', 32".

According to a further embodiment, illustrated for example in FIG. 4, the locking means 47 may comprise one or more pairs of adjustment grub screws 43, 43', 43" which can be inserted into threaded holes 42, 42', 42" provided on the surfaces 46 and 49.

Such embodiment of the locking means 47 may suitably equally space the clamping elements 40 with respect to the hinge body 30. On the other hand, suitably acting on the grub screws, may allow to move the door A with respect to the hinge body 30.

The fixing system 4, allows to couple doors A of any thickness to the hinge 1 in a simple and rapid manner. The fixing system 4, actually allows to fix doors A having thicknesses even greater than the width L31 of the surface 31.

Figure 11:
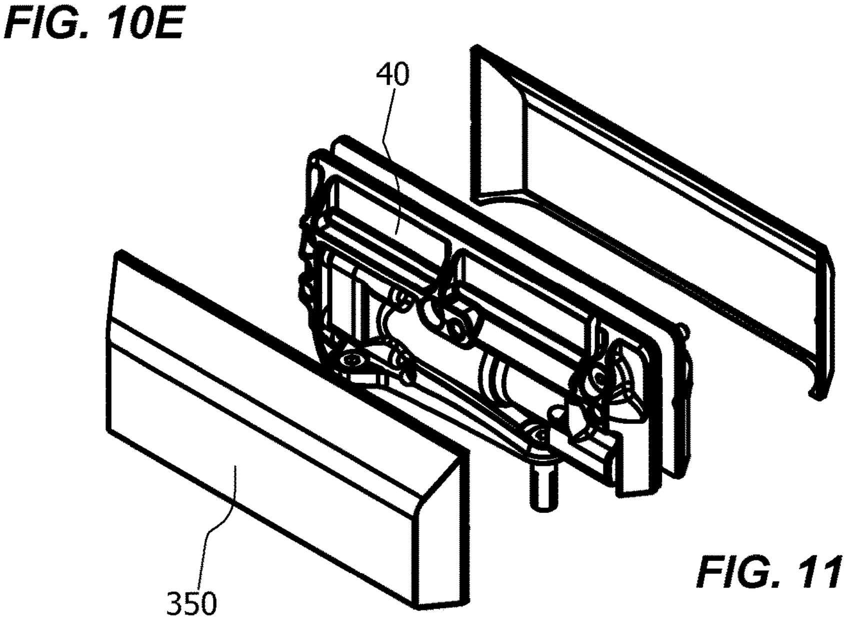
FIG. 11 is an axonometric view illustrating the coupling of the covering elements 350 to the hinge body 30.
Figure 13:
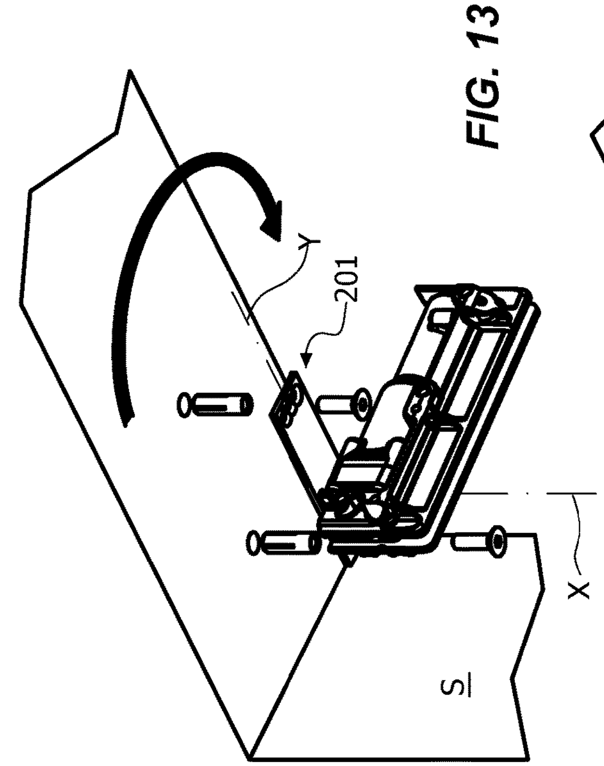
FIGS. 13 and 14 are schematic axonometric views of the mounting of the upper hinge 1 to the ceiling or to the upper upright of a frame of the door A.
Figure 14:
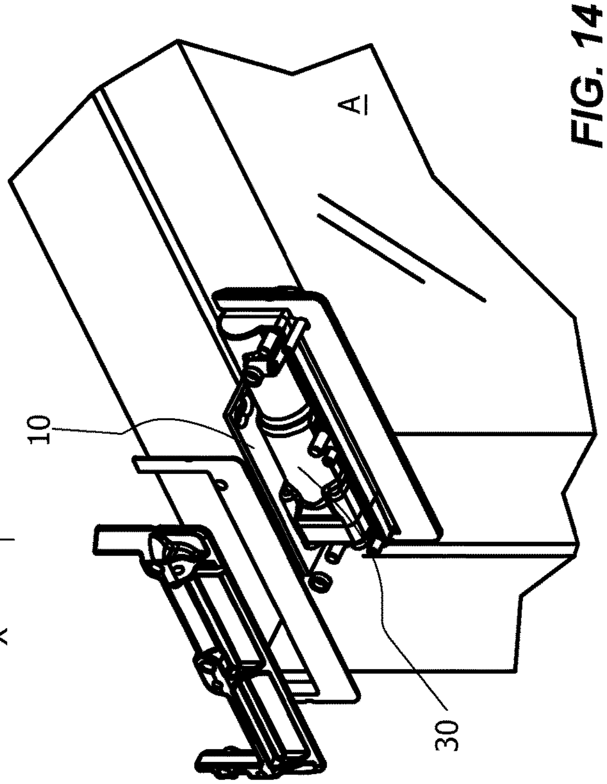
Figure 12:
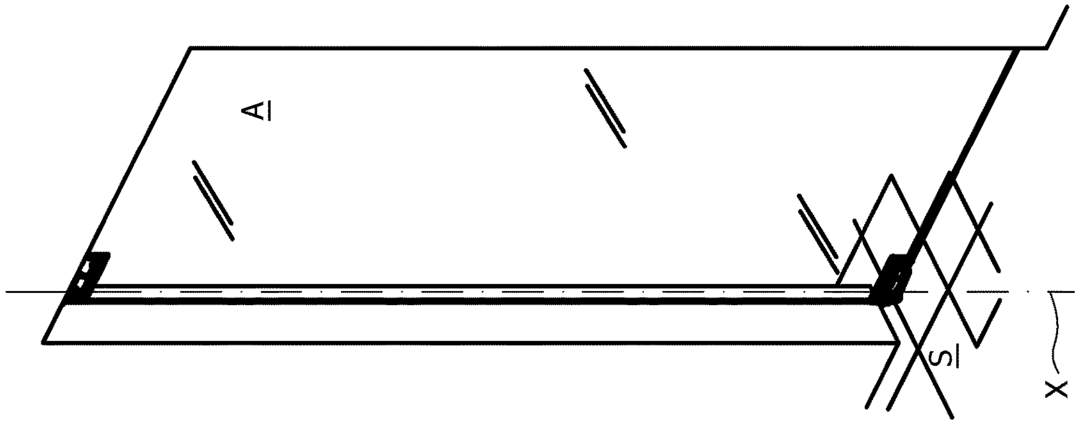
FIG. 12 is a schematic axonometric view of the mounting of two hinges 1 to the floor and to the ceiling.

A further advantage of the fixing system 4, illustrated in particular in FIG. 11, lies in the fact that the elements 350 for covering the clamping elements 40 are always adherent to the door A irrespective of the thickness thereof.

In light of the above, it is clear that the invention attains the pre-set objectives.

The invention is susceptible to numerous modifications and variants all falling within the inventive concept outlined in the attached claims. All details can be replaced by other technically equivalent elements, and the materials can be different depending on the technical needs, without departing from the scope of protection of the invention.

Even though the invention has been described with particular reference to the attached figures, the reference numbers utilized in the description and in the claims are meant for improving the intelligibility of the invention and thus do not limit the claimed scope of protection in any manner whatsoever.

The invention claimed is:

1. A system for fixing a closing element to a stationary supporting structure, the system comprising:

a pair of clamping elements positioned on opposite sides with respect to the closing element to lock the closing element, each of the clamping elements comprising a lower surface, each of the clamping elements comprising a first and a second inner side surface facing the closing element;

a hinge interposed between the clamping elements, the hinge comprising:

a fixed element configured to be anchored to the stationary supporting structure;

a movable element configured to be anchored to the pair of clamping elements, so as to move unitarily with closing element, wherein the movable element includes a hinge body defining a first axis, the hinge body being box-shaped with an upper surface facing the lower surface of the clamping elements, the hinge body comprising a pair of side surfaces opposite and perpendicular with respect to the upper surface, the side surfaces facing the clamping elements, wherein the fixed element comprises a pin defining a second axis perpendicular to the first axis, and a fixing plate defining a third axis, the fixing plate comprising a first face configured to be anchored to the stationary supporting structure and a second opposite face comprising a seat configured to house the pin, and wherein the hinge body and the pin are rotationally coupled to each other so as to rotate mutually around the second axis between an open position and a closed position;

a coupling means for the mutual coupling of the clamping elements, wherein the first and the second inner side surfaces of the clamping elements including at least one of a male or female element, the opposite side surfaces of the hinge body including an equivalent number of male or female elements, and wherein the male or the female elements of both the clamping elements and the hinge body are mutually engageable for guiding the clamping elements; and an adjustment grub screw locking the hinge body to the clamping elements, wherein the adjustment grub screw passes through one of the clamping elements to abut against a respective side surface of the hinge body, so as to adjust a position of the fixing plate in relation to the hinge body.

2. The system according to claim 1, wherein the male element comprises a second pin passing through the hinge body so as to protrude from the side surfaces, the female element comprising at least one hole at the at least one of the clamping elements.

3. The system according to claim 1, wherein the coupling means pass through a first hole in the hinge body so that the hinge body and the clamping elements are removably joined to mount the closing element.

4. The system according to claim 3, wherein the coupling means comprise a screw passing through one of the clamping elements to engage a nut screw in the other one of the clamping elements.

5. The system according to claim 4, wherein the one of the clamping elements comprises a hole for passage of the screw.

6. The system according to claim 5, wherein the first hole is internally smooth.

7. The system according to claim 1, wherein the coupling means are removable.

* * * * *